United States Patent
Douady et al.

(10) Patent No.: US 10,721,412 B2
(45) Date of Patent: Jul. 21, 2020

(54) GENERATING LONG EXPOSURE IMAGES FOR HIGH DYNAMIC RANGE PROCESSING

(71) Applicant: GoPro, Inc., San Mateo, CA (US)

(72) Inventors: Bruno César Douady, Les Molières (FR); Vadim Polonichko, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/231,774

(22) Filed: Dec. 24, 2018

(65) Prior Publication Data

US 2020/0204721 A1 Jun. 25, 2020

(51) Int. Cl.
*H04N 5/235* (2006.01)
*H04N 5/232* (2006.01)
*H04N 5/225* (2006.01)

(52) U.S. Cl.
CPC ....... *H04N 5/2355* (2013.01); *H04N 5/22521* (2018.08); *H04N 5/23216* (2013.01); *H04N 5/232933* (2018.08)

(58) Field of Classification Search
CPC ........... H04N 5/2355; H04N 5/232933; H04N 5/22521; H04N 5/23216
See application file for complete search history.

(56) References Cited

U.S. PATENT DOCUMENTS

| | | | | |
|---|---|---|---|---|
| 2002/0085112 A1* | 7/2002 | Hiramatsu | ........... | H04N 5/2353 348/362 |
| 2015/0312464 A1* | 10/2015 | Peng | .................... | H04N 5/2357 348/226.1 |
| 2016/0119575 A1* | 4/2016 | Dabral | ................. | H04N 5/2355 348/362 |
| 2016/0173750 A1* | 6/2016 | Kyung | ............... | H04N 5/23212 348/362 |
| 2017/0289515 A1* | 10/2017 | Li | ......................... | H04N 5/2354 |
| 2018/0124343 A1* | 5/2018 | Vogelsang | ........ | H01L 27/14634 |
| 2018/0376083 A1* | 12/2018 | Ikuma | .................... | G02B 26/10 |

OTHER PUBLICATIONS

Wikipedia, High-dynamic-range imaging; URL: https://en.wikipedia.org/wiki/High-dynamic-range_imaging, Retrieved on Jan. 11, 2019, 10 pages.
Image Sensor for Camera; https://www.sony-semicon.co.jp/products_en/IS/sensor2/technology/dol-hdr.html, Retrieved on Jan. 11, 2019, 2 pages.

* cited by examiner

*Primary Examiner* — Amy R Hsu
(74) *Attorney, Agent, or Firm* — Young Basile Hanlon & MacFarlane, P.C.

(57) ABSTRACT

Systems and methods are disclosed for generating long exposure images for high dynamic range processing. For example, methods may include receiving a short exposure image that was captured using an image sensor; receiving an additional image that was captured using the image sensor; determining a long exposure image based on the short exposure image and the additional image; applying high dynamic range processing to the short exposure image and the long exposure image to obtain an output image with a larger dynamic range than the short exposure image; and transmitting, storing, or displaying an image based on the output image.

20 Claims, 9 Drawing Sheets

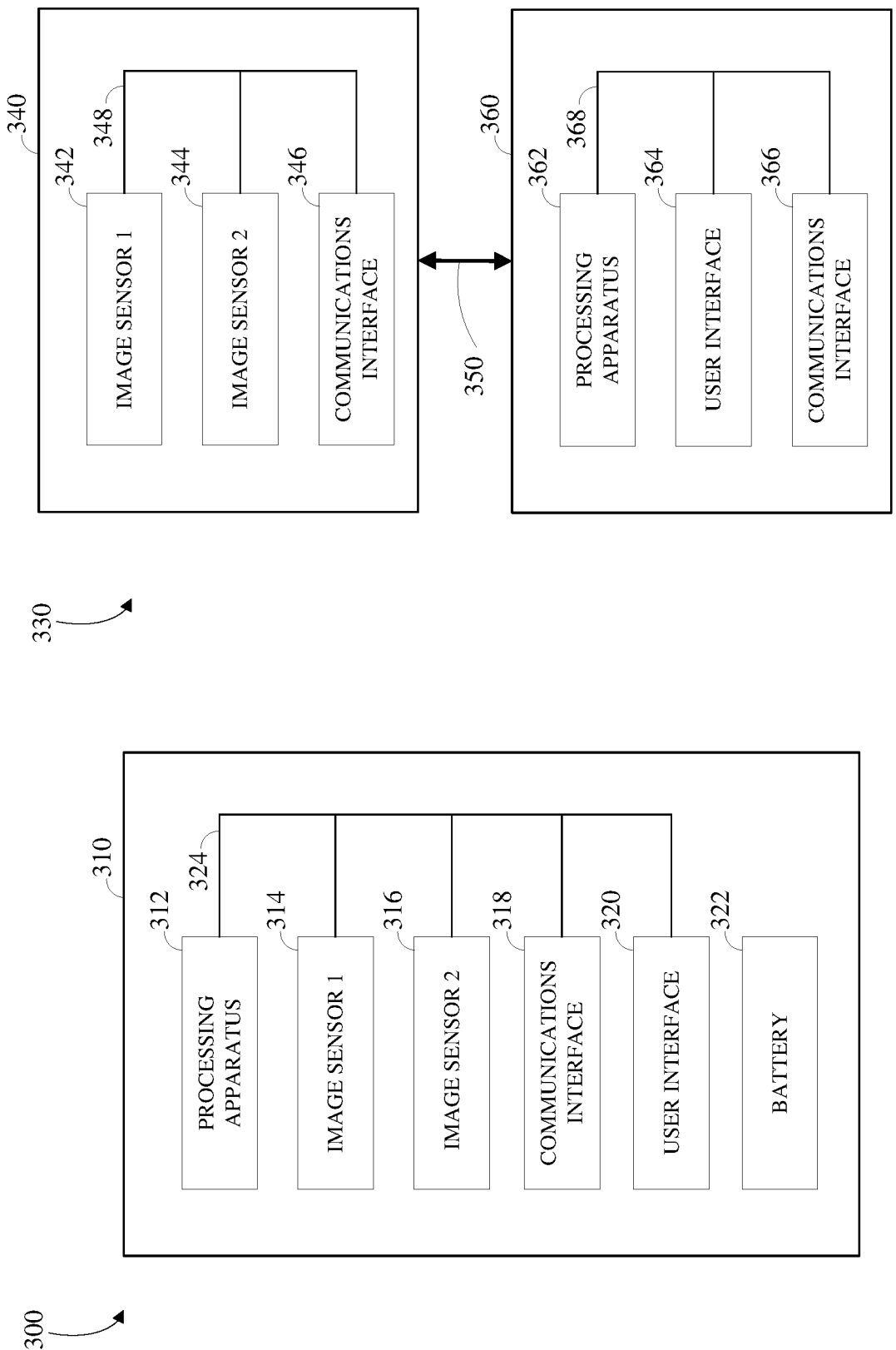

GENERATING LONG EXPOSURE IMAGES FOR HIGH DYNAMIC RANGE PROCESSING

TECHNICAL FIELD

This disclosure relates to generating long exposure images for high dynamic range processing.

BACKGROUND

Image capture devices, such as cameras, may capture content as images (e.g., still images or frames of video). Light may be received and focused via a lens and may be converted to an electronic image signal by an image sensor. The image signal may be processed by an image signal processor (ISP) to form an image, which may be stored and/or encoded. In some implementations, a short exposure image and a corresponding long exposure image of a scene are combined using high dynamic range (HDR) processing to determine an output image with a larger dynamic range than the short exposure image and the long exposure image individually.

SUMMARY

Disclosed herein are implementations of generating long exposure images for high dynamic range processing.

In a first aspect, the subject matter described in this specification can be embodied in systems that include an image sensor configured to capture images and a processing apparatus configured to: receive a short exposure image that was captured using the image sensor; receive an additional image that was captured using the image sensor; determine a long exposure image based on the short exposure image and the additional image; and apply high dynamic range processing to the short exposure image and the long exposure image to obtain an output image with a larger dynamic range than the short exposure image.

In a second aspect, the subject matter described in this specification can be embodied in methods that include receiving a short exposure image that was captured using an image sensor; receiving an additional image that was captured using the image sensor; determining a long exposure image based on the short exposure image and the additional image; applying high dynamic range processing to the short exposure image and the long exposure image to obtain an output image with a larger dynamic range than the short exposure image; and transmitting, storing, or displaying an image based on the output image.

In a third aspect, the subject matter described in this specification can be embodied in a non-transitory computer-readable storage medium. The non-transitory computer-readable storage medium may include executable instructions that, when executed by a processor, cause performance of operations, including receiving a short exposure image that was captured using an image sensor; receiving an additional image that was captured using the image sensor; determining a long exposure image based on the short exposure image and the additional image, wherein determining the long exposure image includes adding the short exposure image to the additional image; and applying high dynamic range processing to the short exposure image and the long exposure image to obtain an output image with a larger dynamic range than the short exposure image.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 3A-B are block diagrams of examples of image capture systems.

DETAILED DESCRIPTION

Figure 1A:
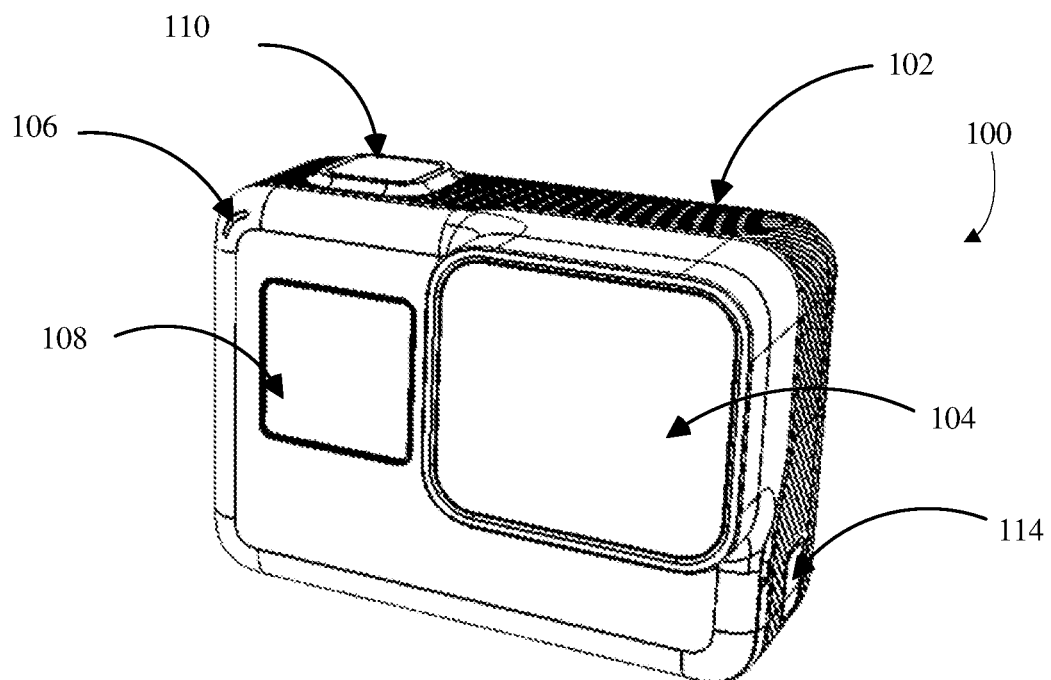
FIGS. 1A-D are isometric views of an example of an image capture device.
Figure 1B:
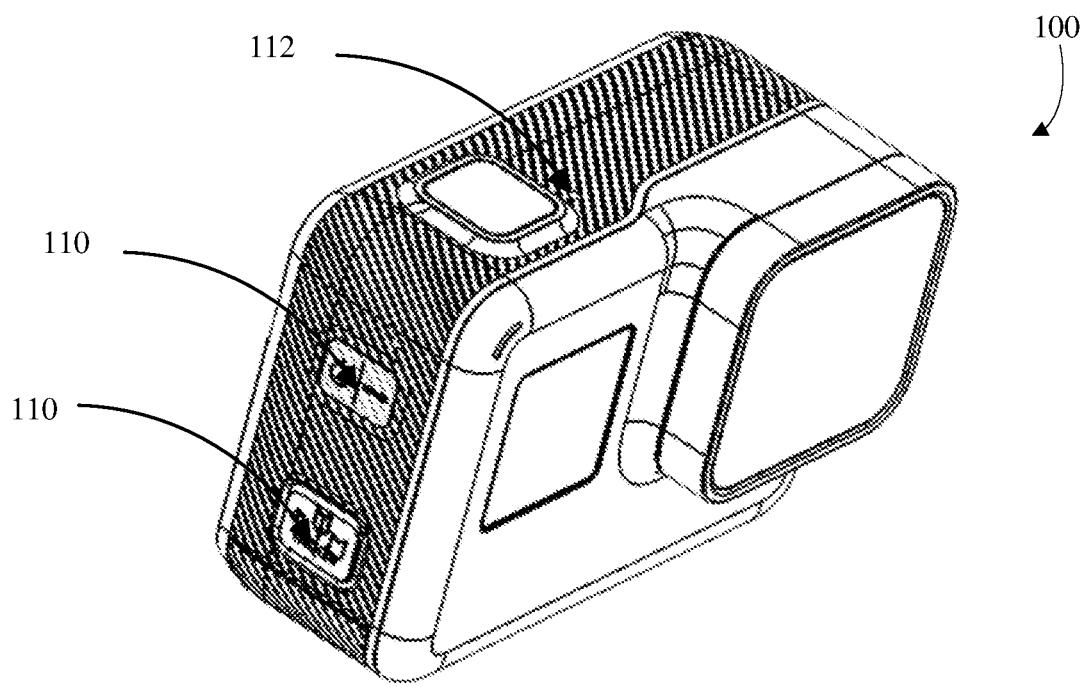
Figure 1C:
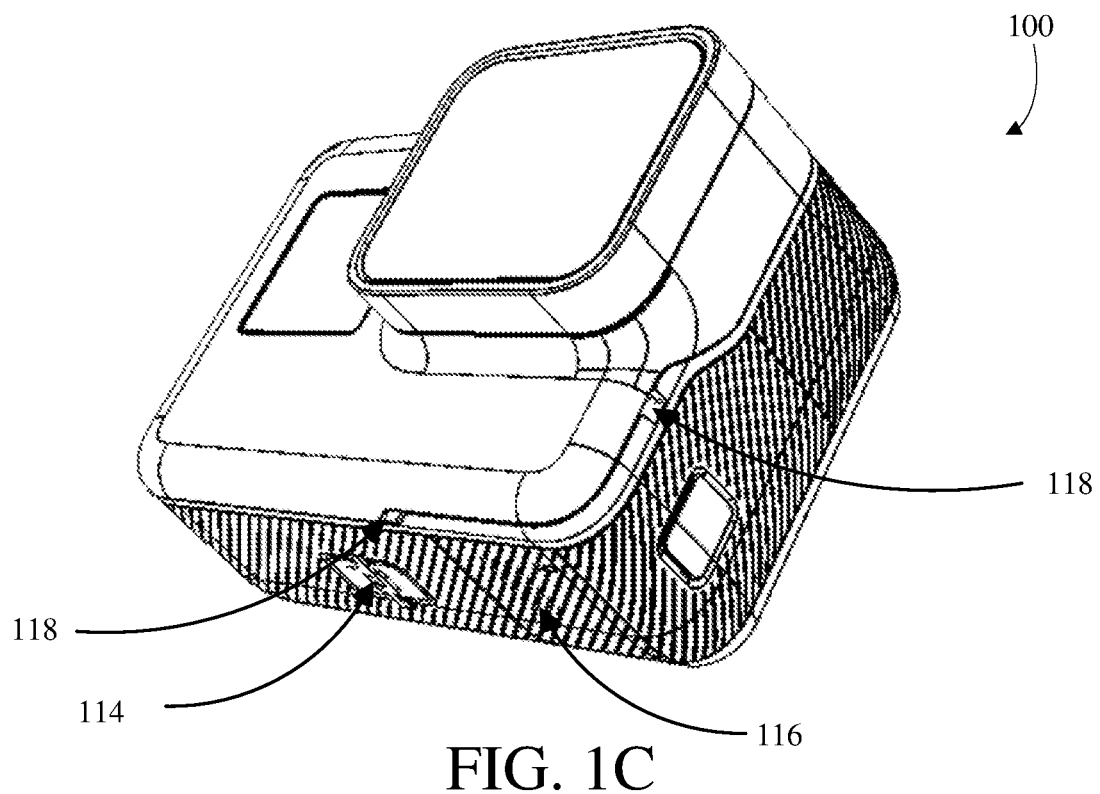
Figure 1D:
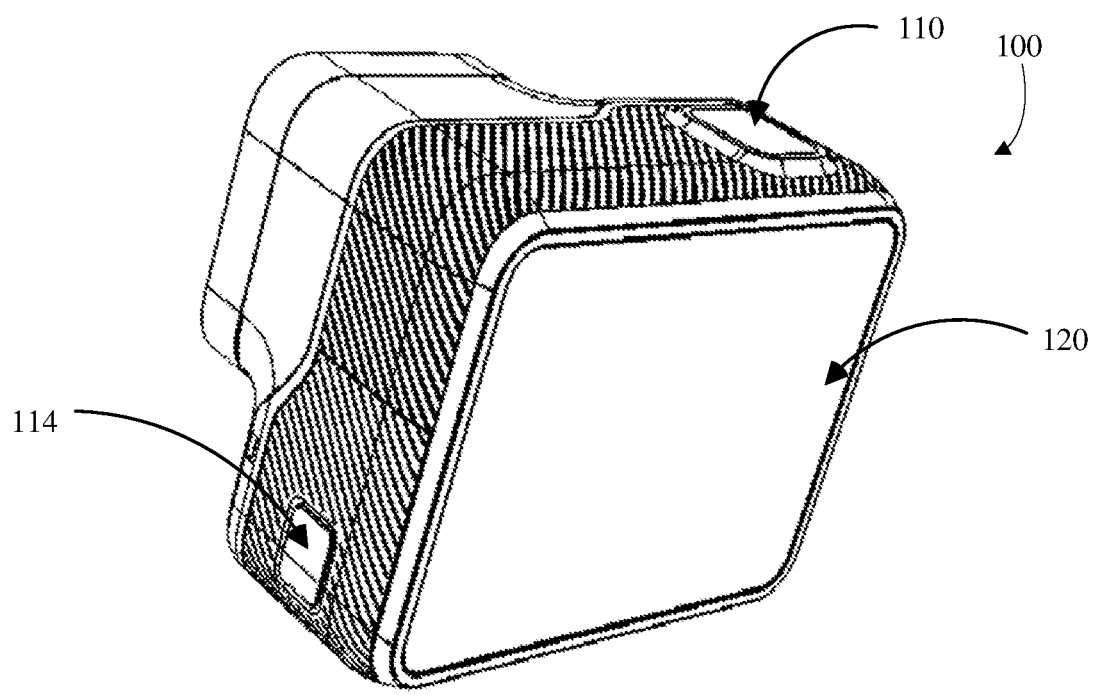

Systems and methods for generating long exposure images for high dynamic range processing are described herein. A long exposure image may be generated based on a short exposure image captured using an image sensor sand an additional image captured using the image sensor. For example, the long exposure image may be determined based on a sum of the short exposure image and the additional image. In some implementations, the additional image may be captured using the image sensor during period of time that is adjacent to a period of time during which the short exposure image is captured. For example, the image sensor may be a digital overlap (DOL) image sensor. High dynamic range processing may be applied to combine the short exposure image and the long exposure image to obtain an output image with a higher dynamic range of pixel values.

Some of the systems and methods described herein may provide advantages over conventional systems and methods for high dynamic range image capture. For example, a time-shift between the capture of the short exposure image and the long exposure image may be reduced compared to conventional methods, which may eliminate and/or mitigate image distortions such as blur and/or ghosting. For example, a probability or frequency of pixel saturation in the long exposure image may be reduced by generating the long exposure image based on a sum of multiple captured images, which may further increase the dynamic range of an output image for a given the image sensor.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, and to otherwise configure the operating mode of the image capture device 100. The image capture device 100 may also include a microphone 112 configured to receive and record audio signals in conjunction with recording video. A side of the image capture device 100 may include an I/O interface 114. The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects the internal electronics which are further described in later sections. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. Additional features, such as the features described above, may be affixed to the exterior. In some embodiments, the image capture device 100 described herein includes features other than those described below. For example, instead of a single interface button, the image capture device 100 may include additional buttons or different interface features, such as multiple microphone openings to receive voice or other audio commands.

Although not expressly shown in FIGS. 1A-D, in some implementations, the image capture device 100 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIGS. 1A-D, the image capture device 100 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

The image capture device 100 may interface with or communicate with an external device, such as an external user interface device, via a wired or wireless computing communication link (not shown). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used. In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links. In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100. Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100, such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
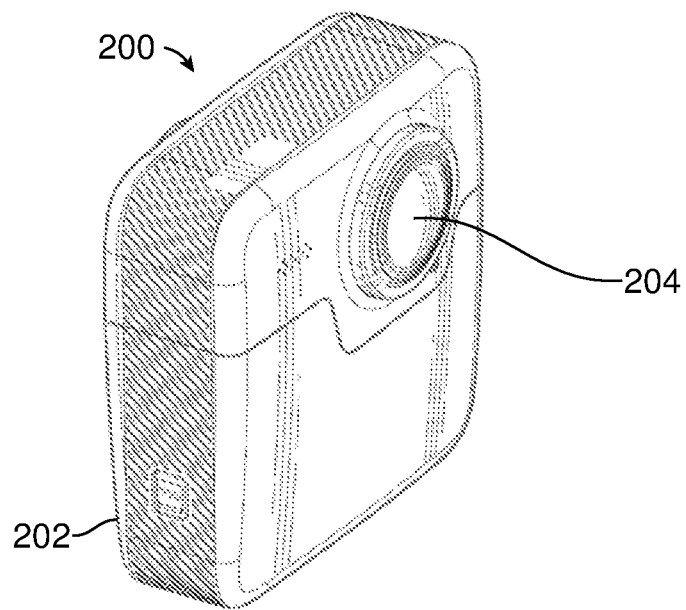
FIGS. 2A-B are isometric views of another example of an image capture device.
Figure 2B:
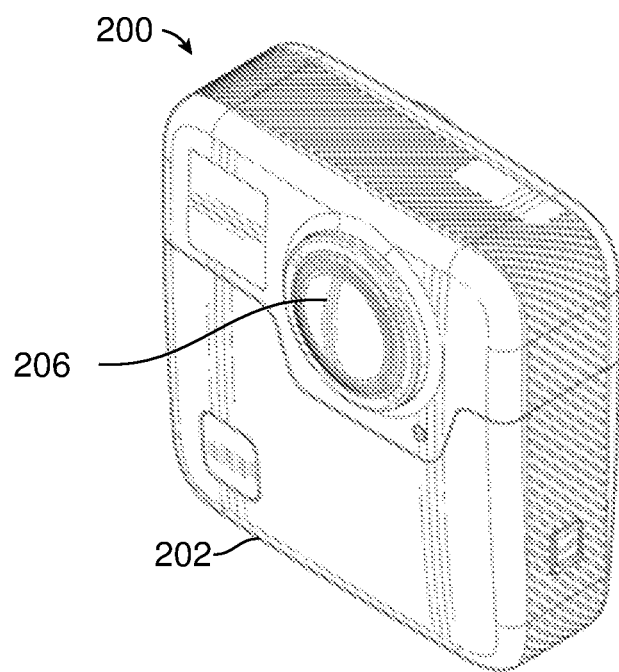

FIGS. 2A-B illustrate an image capture device 200 according to one embodiment. The image capture device 200 comprises a camera body 202 having two camera lenses 204, 206 structured on front and back surfaces of the camera body 202, various indicators on the front and/or back surface of the camera body 202 (such as LEDs, displays, and the like), various input mechanisms (such as buttons, switches, microphones, and touch-screen mechanisms), and electronics (e.g., imaging electronics, power electronics, etc.) internal to the camera body 202 for capturing images via the camera lenses 204, 206 and/or performing other functions. The two lenses 204, 206 are oriented in opposite directions and couple with two images sensors mounted on circuit boards (not shown). Other electrical camera components (e.g., an image processor, camera SoC (system-on-chip), etc.) may also be included on one or more circuit boards within the camera body 202 of the image capture device 200.

Figure 2C:
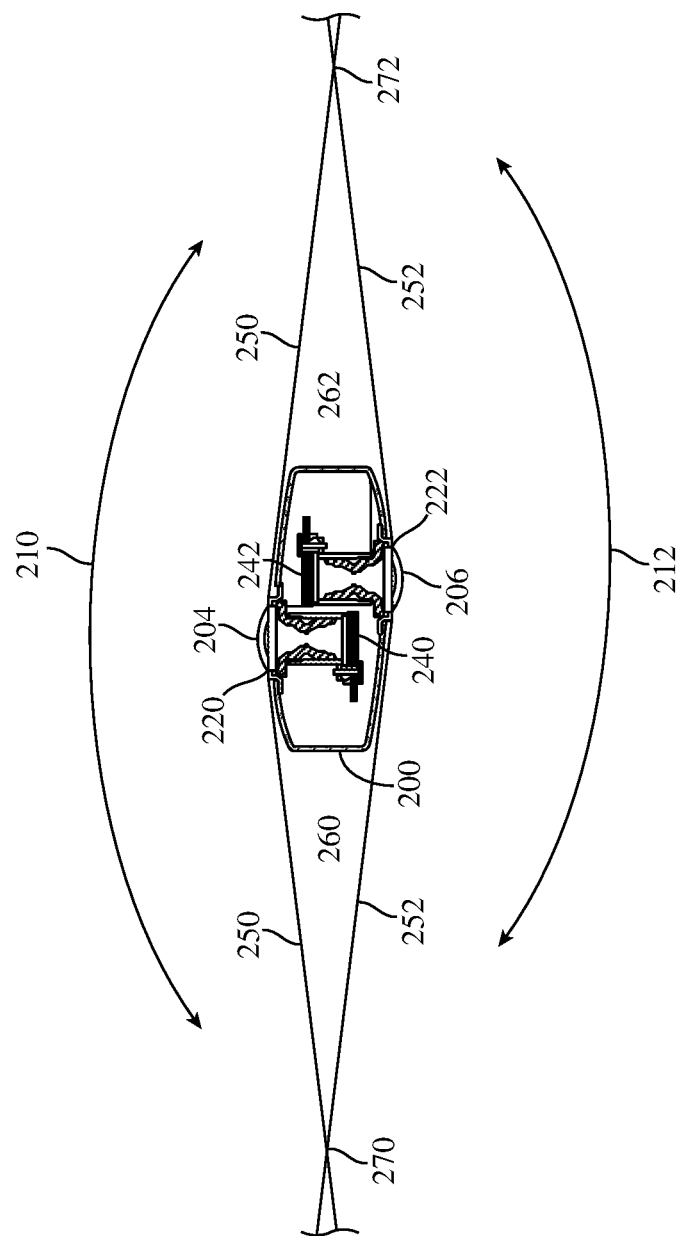
FIG. 2C is a cross-sectional view of the image capture device of FIGS. 2A-B.

FIG. 2C is a cross-sectional view of the image capture device 200 of FIGS. 2A-B. In some implementations, the image capture device 200 may be a spherical image capture device with fields-of-view 210, 212 as shown in FIG. 2C. For example, the image capture device 200 may include image capture devices 220, 222, related components, or a combination thereof, arranged in a back-to-back or Janus configuration. For example, a first image capture device 220 may include the first lens 204 and a first image sensor 240, and a second image capture device 222 may include the second lens 206 and a second image sensor 242 arranged oppositely from the first lens 204 and the first image sensor 240.

The first lens 204 of the image capture device 200 may have the field-of-view 210 shown above a boundary 250. Behind the first lens 204, the first image sensor 240 may capture a first hyper-hemispherical image plane from light entering the first lens 204, corresponding to the first field-of-view 210.

The second lens 206 of the image capture device 200 may have a field-of-view 212 as shown below a boundary 252. Behind the second lens 206, the second image sensor 242 may capture a second hyper-hemispherical image plane from light entering the second lens 206, corresponding to the second field-of-view 212.

One or more areas, such as blind spots 260, 262, may be outside of the fields-of-view 210, 212 of the lenses 204, 206, light may be obscured from the lenses 204, 206 and the corresponding image sensors 240, 242, and content in the blind spots 260, 262 may be omitted from capture. In some implementations, the image capture device 200 may be configured to minimize the blind spots 260, 262.

The fields-of-view 210, 212 may overlap. Stitch points 270, 272, proximal to the image capture device 200, at which the fields-of-view 210, 212 overlap may be referred to herein as overlap points or stitch points. Content captured by the respective lenses 204, 206, distal to the stitch points 270, 272, may overlap.

Images contemporaneously captured by the respective image sensors 240, 242 may be combined to form a combined image. Combining the respective images may include correlating the overlapping regions captured by the respective image sensors 240, 242, aligning the captured fields-of-view 210, 212, and stitching the images together to form a cohesive combined image.

A slight change in the alignment, such as position and/or tilt, of the lenses 204, 206, the image sensors 240, 242, or both, may change the relative positions of their respective fields-of-view 210, 212 and the locations of the stitch points 270, 272. A change in alignment may affect the size of the blind spots 260, 262, which may include changing the size of the blind spots 260, 262 unequally.

Incomplete or inaccurate information indicating the alignment of the image capture devices 220, 222, such as the locations of the stitch points 270, 272, may decrease the accuracy, efficiency, or both of generating a combined image. In some implementations, the image capture device 200 may maintain information indicating the location and orientation of the lenses 204, 206 and the image sensors 240, 242 such that the fields-of-view 210, 212, stitch points 270, 272, or both may be accurately determined, which may improve the accuracy, efficiency, or both of generating a combined image.

Optical axes through the lenses 204, 206 may be substantially antiparallel to each other, such that the respective axes may be within a tolerance such as 1%, 3%, 5%, 10%, and/or other tolerances. In some implementations, the image sensors 240, 242 may be substantially perpendicular to the optical axes through their respective lenses 204, 206, such that the image sensors may be perpendicular to the respective axes to within a tolerance such as 1%, 3%, 5%, 10%, and/or other tolerances.

The lenses 204, 206 may be laterally offset from each other, may be off-center from a central axis of the image capture device 200, or may be laterally offset and off-center from the central axis. As compared to an image capture device with back-to-back lenses, such as lenses aligned along the same axis, the image capture device 200 including laterally offset lenses 204, 206 may include substantially reduced thickness relative to the lengths of the lens barrels securing the lenses 204, 206. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 210, 212.

Images or frames captured by an image capture device, such as the image capture device 100 shown in FIGS. 1A-D or the image capture device 200 shown in FIGS. 2A-C, may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

FIGS. 3A-B are block diagrams of examples of image capture systems. Referring first to FIG. 3A, an image capture system 300 is shown. The image capture system 300 includes an image capture device 310 (e.g., a camera or a drone), which may, for example, be the image capture device 100 shown in FIGS. 1A-D or the image capture device 200 shown in FIGS. 2A-B.

The image capture device 310 includes a processing apparatus 312 that is configured to receive a first image from the first image sensor 314 and receive a second image from the second image sensor 316. The processing apparatus 312 may be configured to perform image signal processing (e.g., filtering, tone mapping, stitching, and/or encoding) to generate output images based on image data from the image sensors 314 and 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312. For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

Figure 5:
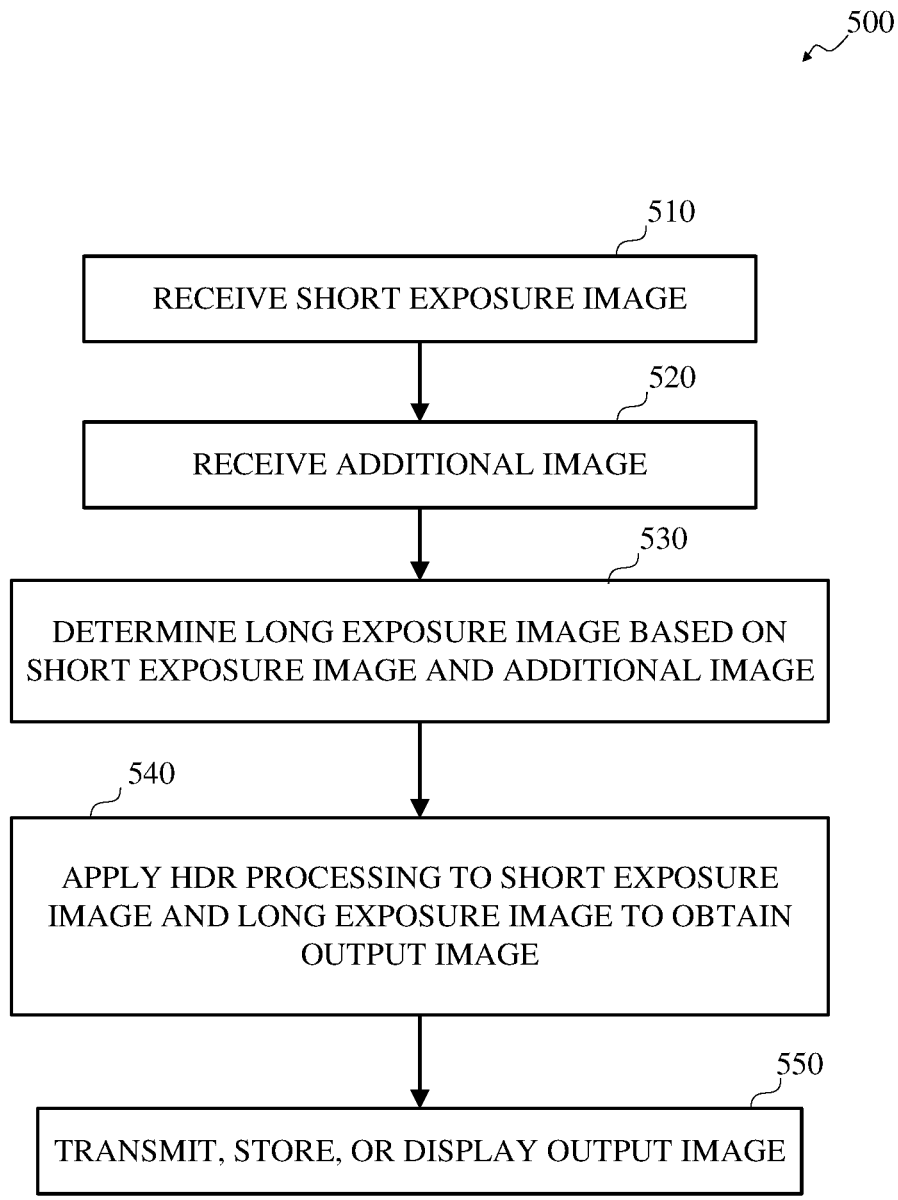
FIG. 5 is flowchart of an example of a process for generating a long exposure image for high dynamic range processing.

The image capture system 300 may implement some or all of the processes described in this disclosure, such as the process 500 described in FIG. 5.

Referring next to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D or the image capture device 200 shown in FIGS. 2A-C. The personal computing device 360 may, for example, be the user interface device described with respect to FIGS. 1A-D.

The image capture device 340 includes a first image sensor 342 and a second image sensor 344 that are configured to capture respective images. The image capture device 340 includes a communications interface 346 configured to transfer images via the communication link 350 to the personal computing device 360.

The personal computing device 360 includes a processing apparatus 362 that is configured to receive, using the communications interface 366, a first image from the first image sensor 342 and a second image from the second image sensor 344. The processing apparatus 362 may be configured to perform image signal processing (e.g., filtering, tone mapping, stitching, and/or encoding) to generate output images based on image data from the image sensors 342, 344.

The first image sensor 342 and the second image sensor 344 are configured to detect light of a certain spectrum (e.g., the visible spectrum or the infrared spectrum) and convey information constituting an image as electrical signals (e.g., analog or digital signals). For example, the image sensors 342 and 344 may include CCDs or active pixel sensors in a CMOS. The image sensors 342 and 344 may detect light incident through a respective lens (e.g., a fisheye lens). In some implementations, the image sensors 342 and 344 include digital-to-analog converters. In some implementations, the image sensors 342 and 344 are held in a fixed relative orientation with respective fields of view that overlap. Image signals from the image sensors 342 and 344 may be passed to other components of the image capture device 340 via a bus 348.

The communications link 350 may be a wired communications link or a wireless communications link. The communications interface 346 and the communications interface 366 may enable communications over the communications link 350. For example, the communications interface 346 and the communications interface 366 may include an HDMI port or other interface, a USB port or other interface, a FireWire interface, a Bluetooth interface, a ZigBee interface, and/or a Wi-Fi interface. For example, the communications interface 346 and the communications interface 366 may be used to transfer image data from the image capture device 340 to the personal computing device 360 for image signal processing (e.g., filtering, tone mapping, stitching, and/or encoding) to generate output images based on image data from the image sensors 342 and 344.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off. In some implementations, commands (e.g., start recording video, stop recording video, or snap photograph) received via the user interface 364 may be passed on to the image capture device 340 via the communications link 350.

The image capture device 340 and/or the personal computing device 360 may be used to implement some or all of the processes described in this disclosure, such as the process 500 of FIG. 5.

Figure 4:
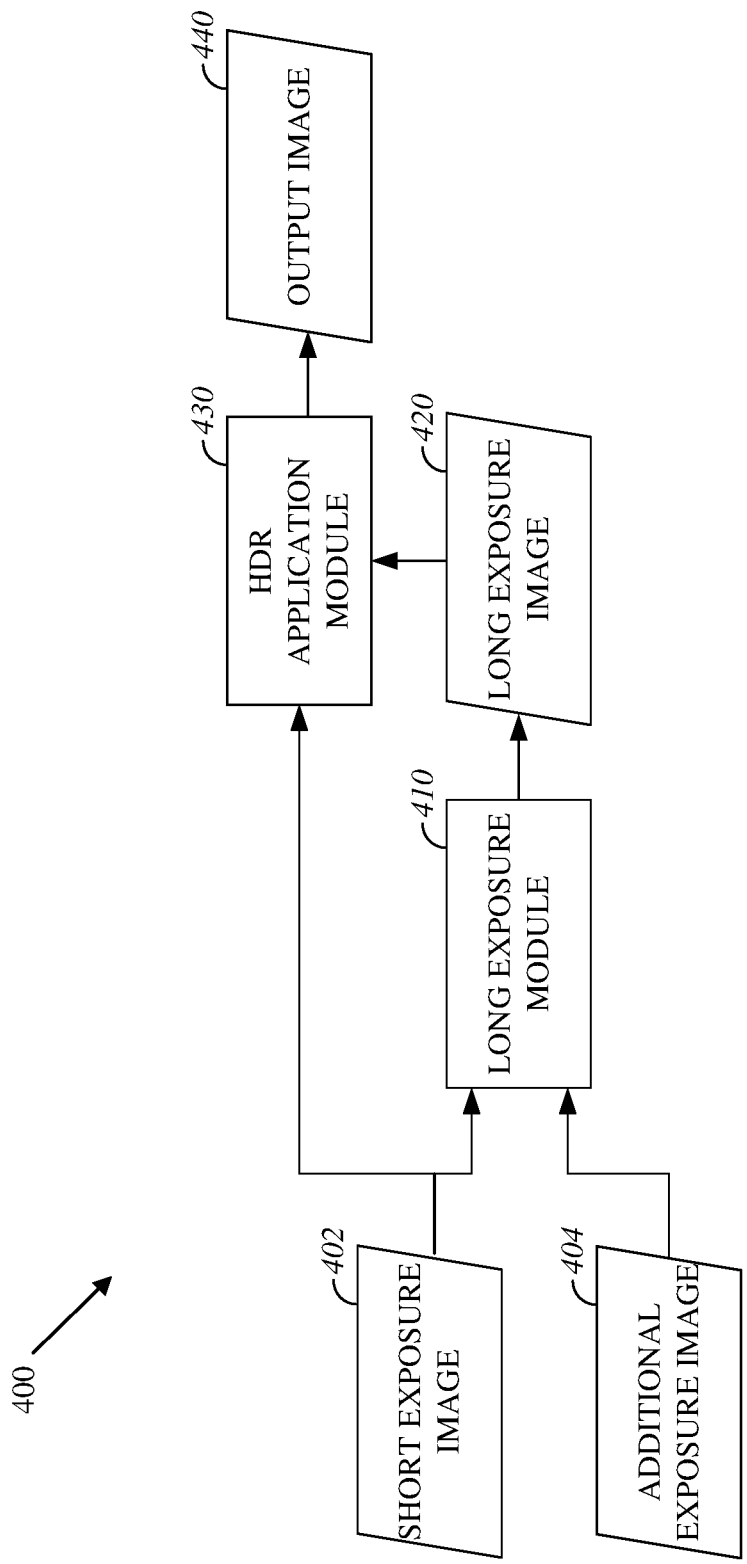
FIG. 4 is block diagram of an example of a system for generating a long exposure image for high dynamic range processing.

FIG. 4 is block diagram of an example of a system 400 for generating a long exposure image for high dynamic range processing. The system 400 is configured to take a short exposure image 402 captured using an image sensor (e.g., the first image sensor 314 or the first image sensor 342) and an additional exposure image 404 captured using the image sensor as inputs. The system 400 includes a long exposure module 410 that is configured to determine a long exposure image 420 based on the short exposure image 402 and the additional exposure image 404 (e.g., by adding corresponding pixel values from the two input images). The system 400 includes a high dynamic range (HDR) application module 430 that is configured to apply high dynamic range processing to the short exposure image 402 and the long exposure image 420 to obtain an output image 440 with a larger dynamic range than the short exposure image. For example, the system 400 may be configured to implement the process 500 of FIG. 5. For example, the system 400 may be implemented as hardware and/or software of a processing apparatus (e.g., the processing apparatus 312 or the processing apparatus 362). In some implementations, a processing apparatus (e.g., the processing apparatus 312) that includes the system 400 is attached to the image sensor (e.g., the first image sensor 314).

For example, the long exposure module 410 may be configured to receive (e.g., via the bus 324 or the communications link 350) the short exposure image 402 that was captured using an image sensor (e.g., the first image sensor 314 or the first image sensor 342), receive an additional image that was captured using the image sensor, and determine a long exposure image based on the short exposure image and the additional image. In some implementations, determining the output image 440 may include adding the short exposure image 402 to the additional exposure image 404. For example, the addition of pixel values may be understood as the addition of the number of received photons by each pixel of each image. In case a gain is applied and the gain is different for the short image (g1) and the additional image (g2), a common gain (g) may be effected for the resulting long exposure image by the adding corresponding pixel values of the short image (v1) and the one of the additional image (v2) according to $g*(v1/g1+v2/g2)$ rather than just v1+v2. The later formula is equivalent to the former in case $g=g1=g2$. For example, the process 600 of FIG. 6 may be implemented to add the short exposure image 402 to the additional exposure image 404. In some implementations, the image sensor is a digital overlap high dynamic range (DOL-HDR) sensor, and the processing apparatus is configured to receive the short exposure image and the additional image in an interleaved pattern of image portions, such that exposure of an image portion of the additional image commences when pixels of a same image portion of the short exposure image are read and reset. For example, the image portion may be a row of pixels. For example, an exposure duration (e.g., 3 ms) of the additional exposure image 404 may be longer than an exposure duration (e.g., 1 ms) of the short exposure image 402.

For example, the high dynamic range application module 430 may be configured to apply high dynamic range processing to the short exposure image and the long exposure image to obtain an output image with a larger dynamic range than the short exposure image. For example, pixels of the long exposure image 420 that are saturated may be replaced by corresponding pixels of the short exposure image 402 in the output image 440, and pixels of the output image 440 may be determined based on corresponding pixels of the long exposure image 420 where those pixels of the long exposure image 420 are not saturated. In some implementations (not shown in FIG. 4), the high dynamic range application module 430 may be configured to apply high dynamic range processing to select among pixels from the short exposure image 402, the additional exposure image 404, and the long exposure image 420.

FIG. 5 is flowchart of an example of a process 500 for generating a long exposure image for high dynamic range processing. The process 500 includes receiving 510 a short exposure image that was captured using an image sensor; receiving 520 an additional image that was captured using the image sensor; determining 530 a long exposure image based on the short exposure image and the additional image; applying 540 high dynamic range processing to the short exposure image and the long exposure image to obtain an output image with a larger dynamic range than the short exposure image; and transmitting, storing, or displaying 550 an image based on the output image. For example, the process 500 may be implemented using the image capture system 300 of FIG. 3A. For example, the process 500 may be implemented using the image capture system 330 of FIG. 3B. For example, the process 500 may be implemented using the system 400 of FIG. 4.

The process 500 includes receiving 510 a short exposure image (e.g., a still image or a frame of video) that was captured using an image sensor (e.g., the first image sensor 314 or the first image sensor 342). The image sensor may be part of an image capture device (e.g., the image capture device 100, the image capture device 200, the image capture device 310, or the image capture device 340). For example, the short exposure image may be received 510 from the image sensor via a bus (e.g., the bus 324). In some implementations, the short exposure image may be received 510 via a communications link (e.g., the communications link 350). For example, the short exposure image may be received 510 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the short exposure image may be received 510 via communications interface 366. For example, the short exposure image may be received 510 via a front ISP that performs some initial processing on the received 510 image. For example, the short exposure image may represent each pixel value in a defined format, such as in a RAW image signal format, a YUV image signal format, or a compressed format (e.g., an MPEG or JPEG compressed bitstream). For example, the short exposure image may be stored in a format using the Bayer color mosaic pattern. In some implementations, the short exposure image may be a frame of video. In some implementations, the short exposure image received 510 is a combined image composed of multiple images from multiple respective image sensors that have been stitched together to form the combined image with a shared field of view.

The process 500 includes receiving 520 an additional image (e.g., a still image or a frame of video) that was captured using the image sensor. For example, the image sensor may be digital overlap high dynamic range (DOL-HDR) sensor. In some implementations, the image sensor is a digital overlap high dynamic range sensor, and receiving 510 the short exposure image and receiving 520 the additional image comprises receiving the short exposure image and the additional image in an interleaved pattern of image portions, such that exposure of an image portion of the additional image commences when pixels of a same image portion of the short exposure image are read and reset. For example, an exposure period of the short exposure image may be adjacent in time to an exposure period of the additional image, which may server to eliminate or mitigate blur and/or ghosting in an output image determined based on the short exposure image and the additional image. For example, the image portion may be a row of pixels, set of rows of pixels, or a block of pixels. In some implementations, an exposure duration (e.g., 3 ms) of the additional image is longer than an exposure duration (e.g., 1 ms) of the short exposure image. In some implementations, an exposure duration (e.g., 1 ms) of the additional image is equal to or shorter than an exposure duration (e.g., 1 ms) of the short exposure image. For example, the additional image may be received 520 from the image sensor via a bus (e.g., the bus 324). In some implementations, the additional image may be received 520 via a communications link (e.g., the communications link 350). For example, the additional image may be received 520 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the additional image may be received 520 via communications interface 366. For example, the additional image may be received 520 via a front ISP that performs some initial processing on the received image. For example, the additional image may represent each pixel value in a defined format, such as in a RAW image signal format, a YUV image signal format, or a compressed format (e.g., an MPEG or JPEG compressed bitstream). For example, the additional image may be stored in a format using the Bayer color mosaic pattern. In some implementations, the additional image may be a frame of video. In some implementations, the additional image received 520 is a combined image composed of multiple images from multiple respective image sensors that have been stitched together to form the combined image with a shared field of view.

The process 500 includes determining 530 a long exposure image based on the short exposure image and the additional image. For example, determining the long exposure image may include adding the short exposure image to the additional image. In some implementations, the short exposure image and the additional image may be added without scaling or after scaling to reverse gains applied by an upstream portion of an image processing pipeline (e.g., a gain applied by a front image signal processor), such that the short exposure image and the additional image are represented in common units. For example, adding the short exposure image and the additional image may approximate capturing a long exposure image over an exposure period including the exposure period of the short exposure image and the exposure period of the additional image. In some implementations, determining the long exposure image includes subtracting a black level of the additional image. For example, determining 530 the long exposure image may include implementing the process 600 of FIG. 6.

The process 500 includes applying 540 high dynamic range processing to the short exposure image and the long exposure image to obtain an output image with a larger dynamic range than the short exposure image. For example, pixels of the long exposure image that are saturated may be replaced by corresponding pixels of the short exposure image in the output image, and pixels of the output image may be determined based on corresponding pixels of the long exposure image where those pixels of the long exposure image are not saturated.

The process 500 includes transmitting, storing, or displaying 550 an image based on the output image. For example, the image may be transmitted 550 to an external device (e.g., a personal computing device) for display or storage. For example, the image may be the same as the output image. For example, the image may be a composite image determined by stitching an image based on the output image to one or more images from other image sensors with overlapping fields of view. For example, the image may be compressed using an encoder (e.g., an MPEG encoder). For example, the image may be transmitted 550 via the communications interface 318. For example, the image may be displayed 550 in the user interface 320 or in the user interface 364. For example, the output image may be stored 550 in memory of the processing apparatus 312 or in memory of the processing apparatus 362.

Figure 6:
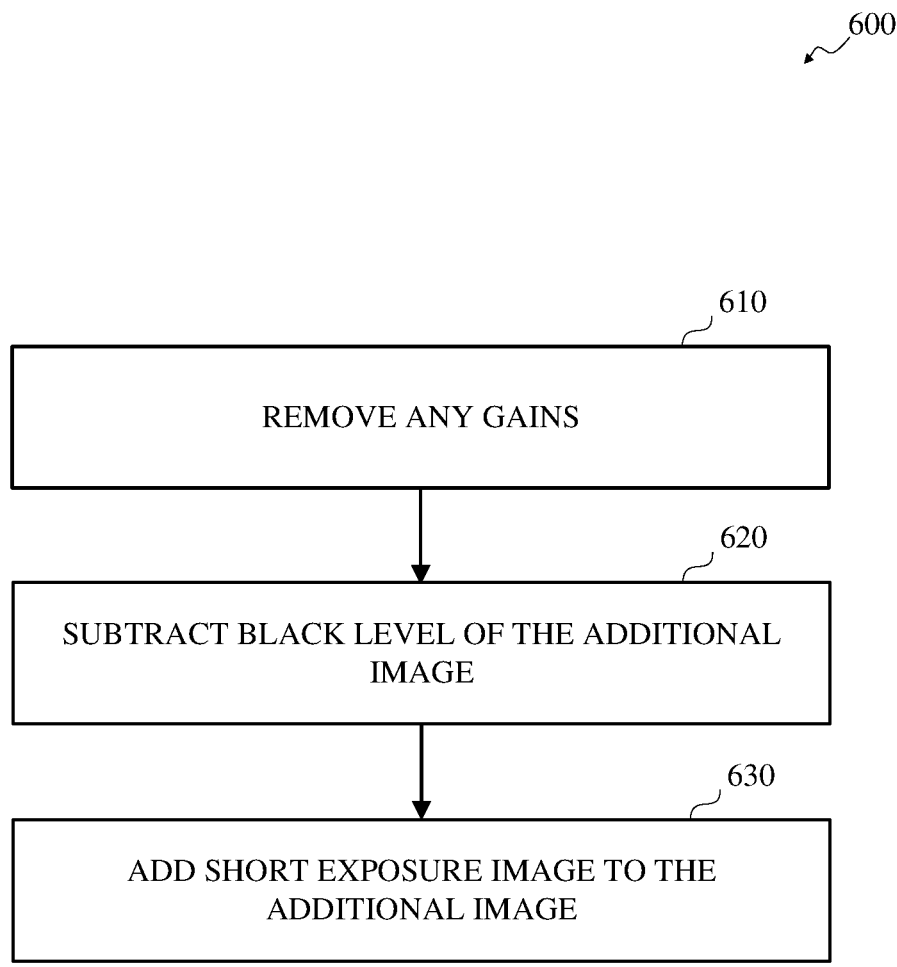
FIG. 6 is flowchart of an example of a process for determining a long exposure image based on a short exposure image and an additional image.

FIG. 6 is flowchart of an example of a process 600 for determining a long exposure image based on a short exposure image and an additional image. The process 600 includes removing 610 any gains; subtracting 620 a black level of the additional image; and adding 630 the short exposure image to the additional image. For example, the process 600 may be implemented using the image capture system 300 of FIG. 3A. For example, the process 600 may be implemented using the image capture system 330 of FIG. 3B. For example, the process 600 may be implemented using the system 400 of FIG. 4.

The process 600 includes removing 610 any gains that have been applied to the short exposure image or the additional image. For example, in some image processing pipelines, automatic gain control and/or automatic white balance processing may be applied to the short exposure image and/or the additional image by an upstream portion of the processing pipeline (e.g., a front image signal processor).

Any such upstream scaling of the pixel values of the short exposure image and/or the additional image may be removed (e.g., by applying an inverse scaling), such that the pixel values of the short exposure image and the additional image are represented in common units.

The process 600 includes subtracting 620 a black level of the additional image. In some implementations, the pixels values of the short exposure image and/or the additional image are represented with a non-zero black level. For example, such a black level may be subtracted 620 from the additional image prior to adding 630 the short exposure image and the additional image. In some implementations (not shown in FIG. 6), the black level of the short exposure image may be subtracted from the short exposure image prior to adding 630 the short exposure image and the additional image. In some implementations (not shown in FIG. 6) (e.g., where saturations of the pixel sums is not an issue for the hardware), the black level of the additional image and/or the short exposure image may be subtracted from a sum of the short exposure image and the additional image.

The process 600 includes adding 630 the short exposure image to the additional image. For example, each pixel value of the short exposure image may be added to a corresponding pixel value of the additional image to determine a corresponding pixel value of a long exposure image.

Figure 7:
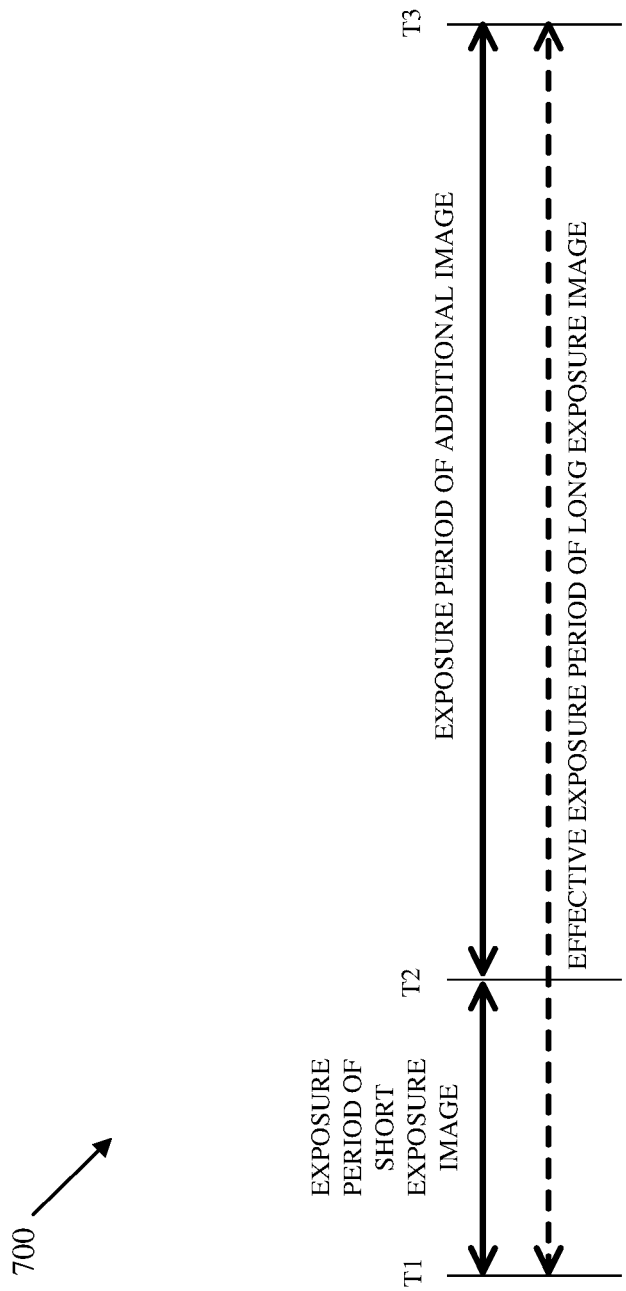
FIG. 7 is a timing diagram of an example of exposure periods of input images for high dynamic range processing.

FIG. 7 is a timing diagram 700 of an example of exposure periods of input images for high dynamic range processing. The timing diagram 700 illustrates image exposure periods between three times: T1, T2, and T3. In this example, a short exposure image is captured during an exposure period extending from T1 to T2. An second exposure period for an additional image then starts at T2, when an image sensor used to capture the short exposure image may be read and cleared or reset, and extends to T3. An effective exposure period for a long exposure image determined based on a sum of the short exposure image and the additional image is also illustrated in the timing diagram 700 as the dashed interval extending from T1 to T3. For example a digital overlap (DOL) image sensor may be used to facilitate capture of the short exposure image and the additional image with minimal time shift between the exposure periods. In this example, the exposure period of the additional image (between T2 and T3) is longer than the exposure period of the short exposure image (between T1 and T2). In some implementations (not shown in FIG. 7), exposure period of the additional image may the same or shorter than the exposure period of the short exposure image. In some implementations (not shown in FIG. 7), the exposure period of the additional image may occur prior to the exposure period of the short exposure image (i.e., the additional image may be captured before the short exposure image).

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. For example, a non-transitory computer-readable storage medium may include executable instructions that, when executed by a processor, cause performance of an operations to implement the process 500 of FIG. 5.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. A system comprising:
   an image sensor configured to capture images, and
   a processing apparatus configured to:
   receive a short exposure image that was captured using the image sensor;
   receive an additional image that was captured using the image sensor;
   determine a long exposure image based on pixel values of the short exposure image and pixel values of the additional image; and
   apply high dynamic range processing to the short exposure image and the long exposure image to obtain an output image with a larger dynamic range than the short exposure image.

2. The system of claim 1, in which the processing apparatus is configured to determine the long exposure image by performing operations comprising:
   adding the short exposure image to the additional image.

3. The system of claim 2, in which the processing apparatus is configured to determine the long exposure image by performing operations comprising:
   subtracting a black level of the additional image.

4. The system of claim 1, in which the image sensor is a digital overlap high dynamic range sensor, and the processing apparatus is configured to receive the short exposure image and the additional image in an interleaved pattern of image portions, such that exposure of an image portion of the additional image commences when pixels of a same image portion of the short exposure image are read and reset.

5. The system of claim 4, in which the image portion is a row of pixels.

6. The system of claim 4, in which an exposure duration of the additional image is longer than an exposure duration of the short exposure image.

7. The system of claim 1, in which the processing apparatus is configured to:
   transmit, store, or display an image based on the output image.

8. The system of claim 1, in which the processing apparatus is attached to the image sensor.

9. A method comprising:
   receiving a short exposure image that was captured using an image sensor;
   receiving an additional image that was captured using the image sensor;
   determining a long exposure image based on pixel values of the short exposure image and pixel values of the additional image;
   applying high dynamic range processing to the short exposure image and the long exposure image to obtain an output image with a larger dynamic range than the short exposure image; and
   transmitting, storing, or displaying an image based on the output image.

10. The method of claim 9, in which determining the long exposure image comprises:

adding the short exposure image to the additional image.

11. The method of claim 10, in which determining the long exposure image comprises:

subtracting a black level of the additional image.

12. The method of claim 9, in which the image sensor is a digital overlap high dynamic range sensor, and receiving the short exposure image and receiving the additional image comprises receiving the short exposure image and the additional image in an interleaved pattern of image portions, such that exposure of an image portion of the additional image commences when pixels of a same image portion of the short exposure image are read and reset.

13. The method of claim 12, in which the image portion is a row of pixels.

14. The method of claim 12, in which an exposure duration of the additional image is longer than an exposure duration of the short exposure image.

15. A non-transitory computer-readable storage medium comprising executable instructions that, when executed by a processor, cause performance of operations comprising:

receiving a short exposure image that was captured using an image sensor;

receiving an additional image that was captured using the image sensor;

determining a long exposure image based on pixel values of the short exposure image and pixel values of the additional image, wherein determining the long exposure image includes adding the short exposure image to the additional image; and applying high dynamic range processing to the short exposure image and the long exposure image to obtain an output image with a larger dynamic range than the short exposure image.

16. The non-transitory computer-readable storage medium of claim 15, in which the executable instructions for determining the long exposure image cause the performance of operations comprising:

subtracting a black level of the additional image.

17. The non-transitory computer-readable storage medium of claim 15, in which the image sensor is a digital overlap high dynamic range sensor, and wherein the executable instructions for receiving the short exposure image and receiving the additional image cause the performance of operations comprising receiving the short exposure image and the additional image in an interleaved pattern of image portions, such that exposure of an image portion of the additional image commences when pixels of a same image portion of the short exposure image are read and reset.

18. The non-transitory computer-readable storage medium of claim 17, in which the image portion is a row of pixels.

19. The non-transitory computer-readable storage medium of claim 17, in which an exposure duration of the additional image is longer than an exposure duration of the short exposure image.

20. The non-transitory computer-readable storage medium of claim 15, wherein the executable instructions cause the performance of operations comprising:

transmitting, storing, or displaying an image based on the output image.

* * * * *